3,712,893
BUTYL-PIPERAZINE DERIVATIVES

Roland Yves Mauvernay, Riom, Norbert Busch, Loubey-rat, Jacques Simond, Chamalieres, and Jacques Moleyre, Mozac, France, assignors to S.A. Centre Europeen de Recherches Mauvernay C.E.R.M., Riom, France
No Drawing. Filed Nov. 10, 1969, Ser. No. 875,504
Int. Cl. C07d 51/70
U.S. Cl. 260—268 PH          1 Claim

ABSTRACT OF THE DISCLOSURE

A compound of the formula

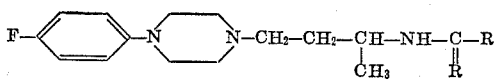

in which R is a phenyl group substituted in the para-position by a halogen atom or furyl or pyridyl or a physiologically acceptable acid addition salt thereof.

---

This invention is concerned with certain novel butyl-piperazine compounds, with a process for their preparation and with compositions containing them.

We have found that butyl-piperazine compounds of the formula

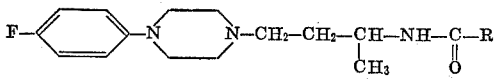

in which R is a substituted or unsubstituted carbocyclic or heterocyclic radical with aromatic unsaturation, particularly phenyl substituted in the para-position by a halogen atom, preferably fluorine or chlorine, or, more advantageously, a heterocyclic radical, such as furyl or pyridyl, and their physiologically acceptable acid addition salts, have valuable anti-histaminic activity and other pharmacological activities and are suitable for use as anti-allergic drugs.

The compounds of the above formula and their acid addition salts are novel and constitute one aspect of the present invention.

The present invention also comprises a process for the preparation of the compounds of the above formula, which comprises (1) reacting 1-(4-fluoro-phenyl)-piperazine with trioxymethylene, (2) reacting the product obtained with hydroxylamine, (3) reducing the oxime obtained with lithium aluminum hydride, and (4) reacting the amine obtained with an acid chloride of the formula, R—CO—Cl, in which R has the above-stated meaning.

The following examples are given by way of illustration only:

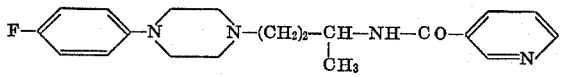

EXAMPLE 1

Preparation of 1-(4-fluoro-phenyl)-4-[3-(3-pyridoyl)-amino]-butyl-piperazine

1st stage.—10 ml. of concentrated (10N) hydrochloric acid and 240 ml. of acetone were added to a solution of 217.5 g. (1 mole) of 1-(4-fluorophenyl)-piperazine dihydrochloride in 400 ml. of 96% ethanol. 50 g. of powdered trioxymethylene were then added and the mixture was then slowly heated to reflux, which was maintained for 1 hour. A further 60 g. of trioxymethylene were then added and heating to reflux was continued for a further 6 hours.

The mixture was then cooled, the precipitate formed was filtered off, washed with acetone and recrystallized from 96% ethanol.

The base was liberated from its salt by taking up the product in an aqueous solution of sodium bicarbonate. The precipitate of the base thus obtained was recrystallized from petroleum ether to give 160 g. of the desired product; M.P. 46° C.; yield 64%.

2nd stage.—45.5 g. (0.65 mole) of hydroxylamine hydrochloride were added to a solution of 128 g. (0.5 mole) of the amino-ketone obtained in the preceding stage in 100 ml. of ethanol and 40 ml. of water. The mixture was allowed to react for 15 minutes at room temperature and was then heated to reflux for ½ hour. A part of the solvent was then distilled off and the product was then allowed to crystallize on cooling. After recrystallization from 96% ethanol, 117 g. of the desired product were obtained; M.P. 170° C.; yield 77%.

3rd stage.—93 g. (0.35 mole) of the oxime obtained in the preceding stage, in the form of the base, were added in portions to a suspension of 17 g. (0.45 mole) of lithium aluminum hydride in 400 ml. of anhydrous ether. The mixture was then heated to reflux for 15 hours.

10 ml. of ethyl acetate and then 50 ml. of dilute caustic soda were added slowly with the usual precautions to the mixture. The organic phase was separated, dried over anhydrous $Na_2SO_4$, the solvent was distilled off and the residue obtained was distilled under reduced pressure to give 51 g. of a thick oil; B.P. (2 mm. ltg.), 142–143° C.; yield 58%.

4th stage.—10 ml. of triethylamine were added to a solution of 25.2 g. (0.1 mole) of the amine obtained in the preceding stage in 100 ml. of anhydrous chloroform and the mixture was cooled to 2°–3° C. While maintaining this temperature, 17 g. (0.12 mole) of nicotinic acid chloride were added with vigorous agitation.

After evaporation of the solvent, the residue was washed with water, the product taking the form of a mass. After recrystallization from ethyl acetate, a constant melting point of 131° C. was obtained.

N% calculated=15.75; N% found=15.60. This compound is referred to below as Compound No. 1.

In order to obtain a water-soluble salt, the trihydrochloride was prepared by treating a solution of the product in absolute ethanol with dry HCl gas. After recrystallization from 96% ethanol, 20 g. of the trihydrochloride salt were obtained; M.P. (dec.) 160° C.; yield 57%.

EXAMPLE 2

1-(4-fluoro-phenyl) - 4 - [3 - (4 - fluoro-benzoyl)-amino]-butyl-piperazine of the formula

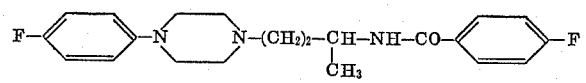

was obtained by a process similar to that of Example 1; M.P. 121° C. This compound is referred to below as Compound No. 2.

EXAMPLE 3

1 - (4 - fluoro - phenyl) - 4 - [3-(4-chloro-benzoyl)-amino]-butyl-piperazine of the formula

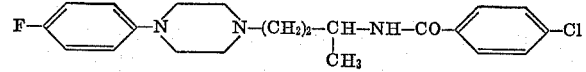

was obtained by a process similar to that of Example 1; M.P. 140° C. This compound is referred to below as Compound No. 3.

EXAMPLE 4

1 - (4 - fluoro - phenyl) - 4 - [3-(2-furoyl)-amino]-butyl-piperazine of the formula

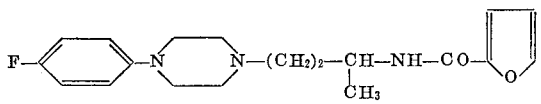

was obtained by a process similar to that of Example 1; M.P. 119° C. This compound is referred to below as Compound No. 4.

Compounds according to the invention were submitted to the following pharmacodynamic tests:

(I) Acute toxicity.—Acute toxicity was determined in mice with oral and intravenous administration. The $LD_{50}$, calculated by the method of B. Behrens and C. Karber (Arch. F. Exp. Path Pharm., 177, 379(1935)) is expressed in mg./kg.

(II) Spasmolytic action: Test on the ileon of guinea pigs.—The ileon was taken from a guinea pig that had been bled to death. A fragment from 2 to 3 centimetres in length was placed in a bath containing an oxygenated Tyrode solution maintained at 30° C. The ileon was stretched between a support at the bottom of the bath and a recording lever which bore against a cylinder coated with carbon black.

The concentration of substance under test required to reduce or abolish the contraction caused by:

$2.10^{-5}$ g./l. of histamine
$1.10^{-5}$ g./l. of bradydinine was determined.

(III) Anti-histaminic action.—This was determined by studying the antagonism of the substance under test with respect to a bronchoconstrictor agent, namely histamine. Bronchospasm was brought about in guinea pigs with a histamine derosol (a 3% solution of histamine in 20% aqueous glycerine).

The time of appearance of the acute crisis of dyspnoea was noted for each animal. Twenty-four hours afterwards, the animals were submitted to a second exposure to the aerosol, 45 minutes after treatment with the substance to be tested and the time of appearance of the dyspnoea crisis was also noted.

2 hours, the substance to be tested (treated animals) or an equivalent quantity of the solvent used (control animals).

One hour after the administration of the substance or the solvent, the animals were placed in groups of two in a circular passage. The latter was swept by six beams of intra-red light. The beams were radially directed, equidistant and each centered on a photo-electric cell.

Each breaking of a beam caused by the passage of an animal was recorded on a counter. The number of breaks, and therefore of movements of the two animals, was taken at the end of 10 minutes. The results obtained with the treated animals were expressed in the form of a percentage increase or reduction with respect to those obtained with the controls.

Study of the potentiation of an inactive dose of barbiturate according to the following procedure.—Tests were first carried out on groups of ten male mice having an average weight of 23 g. and which had fasted for 2 hours previously, to determine the maximum dose of nembutal which, when injected intraperitoneally, did not cause loss of the righting reflex in any of the animals.

The animals, divided into groups of ten, then received, 30 minutes after oral administration of the substance to be tested, the previously determined dose of nembutal. The number of mice which slept for more than 15 minutes was noted.

(VI) Analgesic activity.—This was determined by two methods: Thermal stimulus: method of N. B. Eddy and D. J. Leimbach, Pharmacol. Exp. Ther., 107, 385–393 (1953); Chemical stimulus: method of Koster as modified by Witkin: R. Koster, M. Anderson and E. J. de Beer, Fed. Proc., 18, 412 (1959); L. B. Witkin, C. F. Huebner, F. Galdi, E. O'Keefe, P. Spitaletta and A. J. Plummer, J. Pharmacol. Exp. Ther., 133, 400–408 (1961).

(VII) Anti-inflammatory action.—This was determined by the method of G. Wilheimi and R. Domenjoz, Arzneimittel Forsch., I, 151 (1951).

The results of the pharmacodynamic tests are summarized in the following table:

| Action | Test | Route | Compound No. 1 | Compound No. 2 | Compound No. 3 |
|---|---|---|---|---|---|
| Acute toxicity, $LD_{50}$ (mg./kg.) | | I.V. | 145 | | |
| | | Oral | 890 | [1]1,000 | [1]700 |
| Spasmolytic, $ED_{50}$ (g./l.) | Anti-histamine | | $5.5.10^{-5}$ | $1.9.10^{-5}$ | $4.10^{-5}$ |
| | Anti-bradykinine | | $5.10^{-2}$ | $2.5.10^{-3}$ | $7.10^{-3}$ |
| Anti-histaminic, $ED_{50}$ (mg./kg.) | | I.V. | 0.050 | | |
| | | Oral | 0.4 | 0.7 | 1.8 |
| Anti-tussive, $ED_{50}$ (mg./kg.) | | I.V. | [1]10 | (2) | (2) |
| General sedation, action on the central nervous system, $ED_{50}$ (mg./kg.) | Mobility | Oral | 18 | 12 | 5 |
| | Potentiation of barbiturate | do | 50 | 40 | 34 |
| Analgesic, $ED_{50}$ (mg./kg.) | Thermal stimulus | Oral | 30 | 25 | 20 |
| | Chemical stimulus | do | 5 | 5 | 7 |
| Anti-inflammatory at 62.5 mg./kg. | Percent maximum inhibition | Oral | 54.5 | | |
| | Planimetric value | | 257 | | |

[1] Approximately.  [2] N.R. at 10.

The protection provided by the substance tested was judged by the increase in the duration of exposure to the bronchoconstrictor aerosol. An increase of more than 10 minutes with respect to the control time was considered as total protection. The substances to be tested were administered orally and intravenously.

(IV) Antitussive action.—This was determined by the method of R. Domenjoz (Arch. Exp. Pathol. Pharmacol., 215, 19(1952)).

(V) General sedation: Action on the central nervous system.—This was determined by:

Study of spontaneous mobility (Openfield test) according to the following procedure. Male animals having a weight of from 17 to 20 g. were divided into groups of 10 and received, by oesophageal intubation, after fasting for In the foregoing table, the following abbreviations have the meanings indicated:

$ED_{50}$=effective dose for 50% of the test animals
NR=no response

The properties of Compound No. 4 are similar to those of Compounds No. 1, 2 and 3.

The compounds according to the invention are suitable for the following therapeutic indications: pruriginic dermatoses; allergic respiratory diseases (coughs, rhinorrhoea, etc.); neuropsychic syndrome, agitation; and digestive diseases.

For use in medicine, the compounds according to the invention can be administered orally, in the form of compressed tablets, pastilles, capsules, soluble granules, drops or syrup; rectally, in the form of suppositories or rectal capsules; or by injection, for which they may be provided in the form of lyophilised powder or of ampoules of solution or suspension ready for injection. In all cases the compounds according to the invention will be associated with inert, physiologically acceptable carriers appropriate to the intended mode of administration.

Where such pharmaceutical compositions are in dosage unit form, each dosage unit suitably contains the following amounts of a compound according to the invention: for oral administration, 2.5 to 20 mg., preferably 10 mg.; for rectal administration, 5 to 40 mg., preferably 20 mg.; and for parenteral administration, 5 to 15 mg., preferably 10 mg.

What we claim is:
1. 1-(fluoro-phenyl)-4-[3 - (3-pyridoyl)-amino]-butyl-piperazine.

References Cited

UNITED STATES PATENTS

| | | | |
|---|---|---|---|
| 2,722,529 | 11/1955 | Fleming | 260—268 PH |
| 2,833,770 | 5/1958 | Parcell | 260—268 PH |
| 2,836,595 | 5/1958 | Parcell | 260—268 PH |
| 3,005,821 | 10/1961 | Hayao | 260—268 PH |
| 3,029,241 | 4/1962 | Fancher et al. | 260—268 PH |
| 3,488,352 | 1/1970 | Schipper | 260—268 PH |

FOREIGN PATENTS

| | | | |
|---|---|---|---|
| 1,537,901 | 8/1968 | France | 260—268 PH |

DONALD G. DAUS, Primary Examiner

U.S. Cl. X.R.

260—268 H, 268 FT; 424—250

UNITED STATES PATENT OFFICE
CERTIFICATE OF CORRECTION

Patent No. 3,712,893     Dated January 23, 1973

Inventor(s) Roland Yves Mauvernay et al.

It is certified that error appears in the above-identified patent and that said Letters Patent are hereby corrected as shown below:

On the cover, after line 7 insert the following

-- Foreign Application Priority    France   November 14, 1968

173685 --.

Signed and sealed this 26th day of March 1974.

(SEAL)
Attest:

EDWARD M. FLETCHER, JR.　　　　　　C. MARSHALL DANN
Attesting Officer　　　　　　　　　Commissioner of Patents